364-421 SR
XR 3,544,775
X 49096 X 70453 X 74235 X74363

United States Patent

[11] 3,544,775

[72] Inventors Glenn D. Bergland
Morris Township;
Richard Klahn, Mendham Township,, New Jersey

[21] Appl. No. 605,791
[22] Filed Dec. 29, 1966
[45] Patented Dec. 1, 1970
[73] Assignee Bell Telephone Laboratories, Incorporated
Murray Hill, Berkeley Heights, New Jersey
a corporation of New York

[54] DIGITAL PROCESSOR FOR CALCULATING FOURIER COEFFICIENTS
44 Claims, 9 Drawing Figs.

[52] U.S. Cl. .......... 235/151.31, 324/77; 235/181
[51] Int. Cl. .......... G01r 23/16
[50] Field of Search .......... 235/151.31, 152, 181; 324/77(G), 77(H)

[56] References Cited

UNITED STATES PATENTS

| | | | |
|---|---|---|---|
| 3,023,966 | 1962 | Cox et al. | 235/181 |
| 3,026,475 | 1962 | Applebaum | 324/77H |
| 3,086,172 | 1963 | Johnson | 324/77H |
| 3,163,750 | 1964 | Lindsey et al. | 235/181 |
| 3,209,250 | 1965 | Burns et al. | 324/77 |
| 3,412,334 | 1968 | Whitaker | 235/181X |
| 3,416,081 | 1968 | Gutleber | 324/77 |

FOREIGN PATENTS

| | | | |
|---|---|---|---|
| 797,057 | 6/1958 | England | 235/181 |

OTHER REFERENCES

" An Algorithm for the Machine Calculation of Complex Fourier Series" ; Mathematic of Computation; 19 pp. 297—301 April 1965

*Primary Examiner*—Malcolm A. Morrison
*Assistant Examiner*—Edward J. Wise
*Attorneys*— R. J. Guenther and William L. Keefauver

ABSTRACT: A digital processor for iteratively calculating the Fourier coefficients corresponding to a sequence of N input samples comprising a plurality of individual cascaded stages, each of which combines a result appearing at the output of the previous stage with others of these results and with constant trigonometric function values to form subsequences of Fourier coefficients. The first stage forms N/2 of such subsequences each based on a pair of samples of the original input sequence of Fourier coefficients corresponding to the entire input sequence.

INVENTORS
G. D. BERGLAND
R. KLAHN
BY R.O. Nimtz
ATTORNEY

DIGITAL PROCESSOR FOR CALCULATING FOURIER COEFFICIENTS

This invention relates to signal processing apparatus and more particularly to apparatus for analyzing the frequency spectrum of signals. Still more particularly, this invention relates to a digital processor for analyzing the spectrum of signals.

There are many applications where it is necessary to determine the frequency content of signals. These applications are in fields varying from cardiogram analysis to seismographic analysis as well as the more typical communication and control areas. In some cases it is possible to obtain a permanent record of the signal and then perform a spectral analysis of this record by using a general-purpose digital computer in a manner prescribed, for example, in the monograph entitled The Measurement of Power Spectra by R. B. Blackman and J. W. Tukey, published by John Wiley and Sons, New York, 1962. Using this type of approach, a high degree of accuracy is possible and the results can be smoothed to eliminate any anomalies.

Often, however, it is necessary to obtain frequency spectrum information in real time. That is, a running indication of the spectrum is required while the signal is presented. One technique that has been used in the past to obtain a real-time estimate of the distribution of frequencies in a signal requires a number of narrow-bandpass filters, each tuned to a different portion of the frequency range of the signal. By sampling the outputs of each of these filters, (or some smoothed version of the outputs) an indication of the power contained in the signal over each narrow band can be obtained. It should be noted, however, that a large number of complex precision filters is required if a high degree of resolution is to be obtained in a system of this type. Thus only the largest and most expensive systems can make full use of this technique.

There have been many attempts in the past to simplify the mathematical techniques associated with the classical Fourier transform and thereby to provide simplified spectral analysis. In a paper entitled "An Algorithm for the Machine Calculation of Complex Fourier Series," Mathematics of Computation 19, 297—301, 1965; J. W. Cooley and J. W. Tukey, presented a simplified algorithm for calculating Fourier series coefficients on a digital computer. Through a judicious choice of grouped summations, Cooley and Tukey were able to effect a considerable economy in the number of additions and multiplications needed to determine the desired coefficients. However, because most general-purpose computers are not equipped to perform any large number of parallel arithmetic operations, even the reduced number of operations required by the basic algorithm of Cooley and Tukey proved to be too great to perform real-time spectral analysis in many cases. In addition, the very cost of using a general-purpose computer to perform real-time spectral analysis is generally prohibitive.

Accordingly, it is an object of the present invention to provide simplified, economical means for obtaining real-time estimates of the spectrum of a signal.

The present invention includes means for implementing the Fourier transform algorithm of Cooley and Tukey in the form of an efficient, highly accurate and very fast digital processor. The present invention provides means for calculating Fourier coefficients in real time for one or more simultaneously occurring signals. Several embodiments of the processor will be described below; each of these can be constructed from readily available building blocks. Several simplified embodiments will be described which allow great economies to realized.

BACKGROUND AND THEORETICAL CONSIDERATIONS

Figures 1, 2:
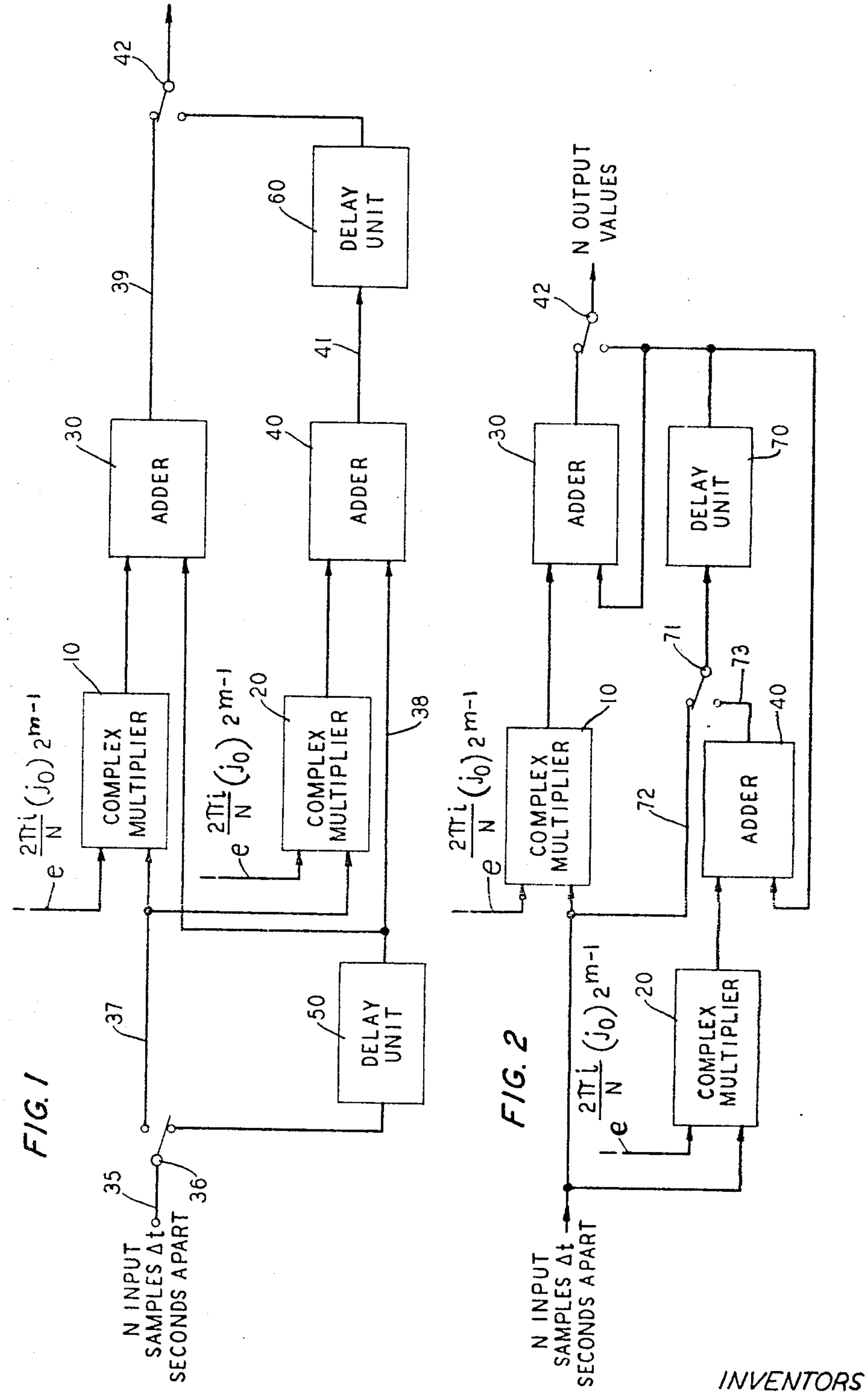
FIG. 1 shows one stage of a processor according to the present invention.
FIG. 2 shows a modified version of the processor of FIG. 1 having a reduced number of components.

Before proceeding with a detailed description of particular embodiments of the present invention, it would be well to review some pertinent aspects of spectrum analysis by computer techniques. A speech signal such as is found on typical telephone lines will be used for purposes of this preliminary discussion. Such a speech signal after having been bandpass filtered will contain frequency components in the range from 0 to 4,000 Hz. A particular application where knowledge of the frequency distribution over this range would be of considerable importance would be one involving vocoders for the more efficient use of a telephone channel.

Although a speech signal cannot generally be represented by a periodic time function, a Fourier series analysis can be performed on a corresponding periodic time function $A(t)$ which is identical to the function representing the speech signal over some finite time interval (0,T). The result of the Fourier series analysis of the periodic function then serves as an estimate of the spectrum of the speech signal during the interval (0,T).

The Fourier series representation for $A(t)$ is given by $$A(t)=\sum_{k=-\infty}^{\infty} a_k e^{-ik\omega_0 t}$$

where $i^2=-1$, $\omega_0=\frac{2\pi}{T}$ and the constants $a_k$ are given by $$a_k=\frac{1}{T}\int_{l_0}^{T} A(t)e^{+ik\omega_0 t}dt$$

For practical solution on a digital computer (in accordance with Blackman and Tukey, supra, for example) the periodic function is sampled at N distinct instants during the interval (O,T). The sampled function $S(t)$ is given by $$S(t)=\sum_{n=0}^{N-1} A(n\Delta T)\delta(t-n\Delta T)0\leq t\leq T$$

where $\Delta T=T/N$ and $\delta$is the impulse singularity function. The corresponding Fourier series coefficients $s_k$ are then given by $$s_k=\frac{1}{T}\int_0^T\left[\sum_{n=0}^{N-1} A(n\Delta T)\delta(t-n\Delta T)\right]e^{+ik\omega_0 t}dt$$

$$s_k=\frac{1}{T}\sum_{n=0}^{N-1} A(n\Delta T)\int_0^T\delta(t-n\Delta T)e^{+ik\omega_0 t}dt$$

$$s_k=\frac{1}{T}\sum_{n=0}^{N-1} A(n\Delta T)e^{+ik\omega_0 n\Delta T}$$

$$W=e^{+2\pi i/N}$$

$$s_k=\frac{1}{T}\sum_{n=0}^{N-1} A(n)W^{kn},\ n=0,1\ldots N-1_m \qquad (1)$$

The magnitude of the coefficients given by equation (1) can be squared to give an estimate of the power spectrum of the original speech signal. However, because of the large number of complex arithmetic operations required by equation (1), it is not generally possible for all N coefficients to be calculated within a period T seconds long, i.e., equation (1) cannot generally be solved in real time.

Cooley and Tukey, supra, have attacked the problem in a somewhat different manner. For $N=r_1r_2\ldots r_m$, with the $r\mu$ assuming integer values for $\mu=1, 2\ldots m$, the number of arithmetic operations (an operation is taken to be complex multiplication followed by complex addition) can be reduced by a factor of $N^2/N(r_1+r_2+...+r_m)$.

In brief, the Cooley-Tukey algorithm reduces equation (1) to a recursive relation the exact form of which depends on the properties of N. Starting with an initial list of numbers $b_0$, subsequent lists $b_p$ are calculated, the final one of which comprises the required Fourier coefficients. When N is taken equal to $2^m$, $m$ lists will be calculated. Each of the N entries in a list is identified by an $m$-digit binary integer. For example, one entry takes the form $b_p(j_0, j_1, \ldots, j_{p-1}, k_{m-p-1}, \ldots k_0)$ where each of the $j$'s and $k$'s are binary integers.

For the special case mentioned, $N = 2^m$, the recursive relation takes the form $$b_p(j_0, j_1, \ldots, j_{p-1}, k_{m-p-1}, \ldots, k_0)$$
$$= b_{p-1}(j_0, j_1, \ldots, j_{p-2}, O, k_{m-p-1}, \ldots k_0)$$
$$+ b_{p-1}(j_0, j_1, \ldots, j_{p-2}, l, k_{m-p-1}, \ldots k_0)$$
$$\cdot e^{\frac{2\pi i}{N}(j_{p-1}2^{p-1}+j_{p-2}2^{p-2}+\ldots+j_0)2^{m-p}} \qquad (2)$$

The binary number specified by the argument $j_0, j_1, \ldots, j_{p-1}, j_{m-p-1}, \ldots, k_0$ can be written simply as $k$, i.e., $b_p(j_0, j_1, \ldots, j_{p-1}, k_{m-p-1}, \ldots k_0) \equiv b_p(k)$.

As may be seen from equation (2), a highly regular pattern is followed in calculating the terms in the current list. For purposes of constructing the list $b_1$, the list $b_0$ is considered to be portioned into two equal-length sublists or parts. Each term $b_1(k)$ in the list $b_1$ is derived from two terms from the list $b_0$. One of these terms from $b_0$ is multiplied by the complex phasor $W^{(j_{p-1}2^{p-1}+j_{p-2}2^{p-2}+\ldots+j_0)2^{m-p}}$, where, as before, $W = e^{2\pi i/N}$. The first term of $b_1$ consists of the first term in $b_0$ plus the first term in the second half of $b_0$ multiplied by $e^{\frac{i2\pi}{N}(0)2^{(m-1)}} = 1 + j0$. Likewise the second term of $b_1$ is made up of the second term in $b_0$ plus the second term in second half of $b_0$ multiplied by the same complex value. This process is continued for all terms in the first half of $b_1$. To obtain the terms in the second half of $b_1$, a similar scheme is followed except that the terms in the second half are multiplied by $e^{i\pi} = -1 + j0$.

The algorithm proceeds by transforming the list $b_1$ into a third list $b_2$, and so on. The same type of operations apply in each case, except that after each iteration the list is effectively partitioned into twice as many parts as before. Terms from adjacent parts of the then-current list are used to form the required terms for the list then being constructed. To illustrate this point, a partial listing is given by equations (3)

$$b_1(j_0, k_{m-2}, \ldots, k_0) = b_0(O, k_{m-2}, \ldots, k_0)$$
$$+ b_0(l, k_{m-2}, \ldots, k_0)W^{(j_0)2^{m-1}}$$
$$b_2(j_0, j_1, k_{m-3}, \ldots, k_0) = b_1(j_0, O, k_{m-3}, \ldots, k_0)$$
$$+ b_1(j_0, l, k_{m-3}, \ldots, k_0)\cdot$$
$$W^{(j_1 2^1+j_0)2^{m-2}}$$
$$b_3(j_0, j_1 j_2, k_{m-4}, \ldots, k_0) = b_2(j_0, j_1, O, k_{m-4}, \ldots, k_0)$$
$$+ b_2(j_0, j_1, l, k_{m-4}, \ldots, k_0)\cdot$$
$$W^{(j_2 2^2+j_1 2+j_0)2^{m-3}}$$
$$\ldots\ldots\ldots\ldots\ldots\ldots \qquad (3)$$
$$b_m(j_0, j_1, \ldots, j_{m-1}) = b_{m-1}(j_0, j_1, \ldots, j_{m-2}, O)$$
$$+ b_{m-1}(j_0, j_1, \ldots, j_{m-2}, l)\cdot$$
$$W^{(j_{m-1}2^{m-1}+j_{m-2}2^{m-2}+\ldots+j_0)2^0}$$

Note particularly that in computing the $b_2$ elements, values are selected from the first and second or third and fourth quarters of $b_1$, depending on the value of $j_0$ for the element currently being calculated. Similarly, in calculating elements of $b_3$, the terms to be used will be selected from the first and second, third and fourth, fifth and sixth, or the seventh and eighth "eighths" of $b_2$ depending on the values of $j_0$ and $j_1$ in the arguments of the $b_3$ elements currently being calculated. In all cases the exact elements chosen from the respective parts of the lists will be determined by the digits $k_{m-p-1}$ to $k_0$. These chosen elements will have arguments differing only in the $k_{m-p}$ digit.

Another point worth noting in connection with equations (3) is that only $W^0$ and $W^{2^{m-1}}$ need be calculated or stored while calculating the list $b_1$. For $b_2$, $W^0$, $W^{2^{m-2}}$ and $W^{(2^{m-1}-2^{m-2})}$ and $W^{(2^{m-1}+2^{m-2})}$ need be known. For the mth list calculated, $b_m$, $N$ distinct values of $W^{(j_{p-1}2^{p-1}+\ldots+j_0)2^{m-p}}$ are required.

Viewed alternately, the basic operation in the binary formulation of the Cooley-Tukey algorithm is, as illustrated by equation 2, the combining of the Fourier coefficients of two interleaved sample records to yield one set of coefficients corresponding to twice the sampling frequency. The operation is applied to computing Fourier coefficients for an N-sample record by regarding each sample as an independent one-term record. Because of the assumed periodicity, the sampling interval for each of these one-sample records is the period T of the sampled function. The Fourier coefficient for each such one-sample record is the sample value itself. Equation 2 with $p = 1$, may be used to pair samples, i.e., series, displaced by T/2, half the sampling period of the one-sample records. With $p = 2$, equation 2 may be applied to the pairing of the two-term series, resulting in N/4 series, each with four coefficients and based on samples spaced uniformly at intervals of T/4, etc. If N (the size of the total record) is a power of 2, the described procedure is applied recursively to yield one combined N-term Fourier series for the N samples. Since the series' length is doubled with each iteration, the number of iterations required is $\log_2 N$. Because the total number of coefficients generated during each iteration is N ($N/2^i$ series each $2^i$ in length), and one multiplication is required for each pair of coefficients formed during any iteration, the total number of multiplications is $(N/2) \cdot \log_2 N$.

DETAILED DESCRIPTION

If N, the number of input samples to be analyzed is taken equal to $2^m$ as above, one embodiment of the present invention comprises $m$ computing stages each of which takes the general form shown in FIG. 1. For purposes of discussion, the circuit illustrated will be considered to be the first stage, i.e., that for calculating the list $b_1$ from the list $b_0$ comprising the input sample values. The stage shown includes two complex multipliers 10 and 20, each of which is capable of forming the complex product $b_0(k)e^{\pi i j_0}$. Also included are adders 30 and 40 and delay units 50 and 60, the latter each producing an output delayed from its input by T/2 seconds.

Elements from the list $b_0$, which represent sample values of the signal to be analyzed, are presented at node 35 at intervals of $\Delta t = T/N$ seconds. Switch 36 is controlled to allow the first N/2 sample values from each list $b_0$ pass sequentially into the delay unit 50 starting at time $t=0$. The remaining N/2 sample values from each list are applied sequentially at node 37 beginning at $t=N\Delta t/2=T/2$. Thus at $t=T/2$, $b_0(00...0)$ appears at node 38, while $b_0(100...0)$ appears at node 37. The multipliers then form the products $b_0(k)e^{\pi i\cdot 0}$ and $b_0(k)e^{\pi i\cdot 1}$ beginning with $k = 100\ldots0$ and terminating with $k = 11\ldots1$. As each of these products is formed there is added to it the element from $b_0$ then emerging from the delay unit 50. Thus, the first sum to be formed at node 39 in FIG. 1 is $b_0(100\ldots00)e^{\pi i\cdot 0} + b_0(00\ldots0)$; this is precisely $b_1(00\ldots0)$. Similarly, the first sum formed at node 41 is $b_0(100\ldots0)e^{\pi i\cdot 1} + b_0(00\ldots0)$, which is $b_1(100\ldots0)$.

The operations used to find $b_1(00...0)$ and $b_1(10...0)$ are then repeated during the next $\Delta t$ interval to generate $b_1(00...1)$ and $b_1(10...01)$ at nodes 39 and 41 respectively. This process continues until all of the elements of $b_1$ have been calculated. The sums generated at node 41 are delayed T/2 seconds by delay unit 60. Thus, the second half of the list $b_1$ is made to follow immediately after the first half by simply moving switch 42 to its lower position at $t$=T.

Although two multipliers 10 and 20 are shown in FIG. 1, it is possible to easily eliminate one of them. This is so because the symmetry of the trigonometric arguments of the multiplier functions results in products that differ only in sign. Thus, one multiplier and a negating circuit can replace the pair of multipliers. Similar simplifications will occur to those skilled in the art in connection with certain other embodiments of the present invention described below.

Succeeding stages in this embodiment employ identical functional elements in cascade. The input presented at node 35 of a given stage $p$ will, of course, be the sequence of values from the preceding list, i.e., that generated by stage $p$−1. Because of the aforementioned partitioning of each list, the delay units employed in successive stages need have only one-half the delay of the units in the immediately preceding stage.

A variation of the embodiment of FIG. 1 is shown in FIG. 2. Here, a single delay unit 70, replacing the two delay units 50 and 60 in FIG. 1, is used in combination with the other major elements from FIG. 1. The use of a single delay unit is possible because the two delay units 50 and 60 each provide the same delay but are never required to accept an input or provide an output simultaneously. Switch 71 is used to connect the delay unit 70 alternately to nodes 72 and 73 for equal time durations. The exact duration depends as in the circuit of FIG. 1, on the particular list generated by the stage being considered.

Figure 3:
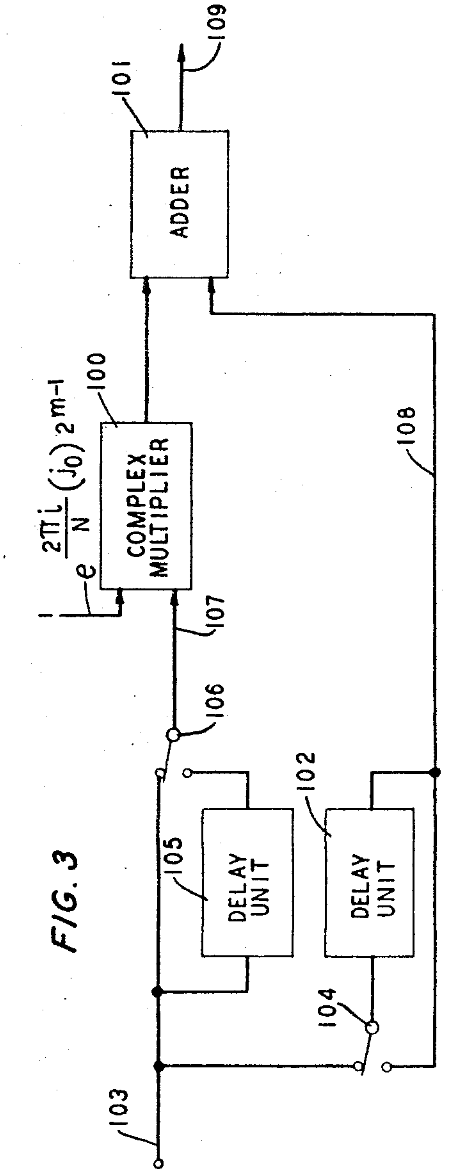
FIG. 3 shows a typical stage of another embodiment of the present invention having only one multiplier and one adder per stage.

FIG. 3 shows another embodiment of the present invention. This circuit has the advantage that it requires only one complex multiplier 100 and one adder 101. With switch 104 in its upper position, delay unit 102 is used in the same manner as the corresponding unit 50 in the circuit of FIG. 1. That is, the delay unit 102 is used to provide a delayed part of a list in synchronism with a later nondelayed part. Thus, when the circuit of FIG. 3 is used to generate list $b_1$ from list $b_0$, delay unit 102 introduces a delay of T/2 in the presentation of the first half of list $b_0$. For this case the multiplier 100 and adder 101 (with switch 106 in its upper position) then form $b_1(00...0)$ through $b_1(01...1)$ starting at time $t$=T/2. Here, as before, time is measured from the instant that the first element of $b_0$ is entered at node 103. Switch 104 is also moved from its upper position to its lower position at $t$=T/2. This allows the first half of the list $b_0$ to be reentered at the input of delay unit 102. At $t$=T switch 106 is moved from its upper position to its lower position, thereby providing a repetition of elements $b_0(10...0)$ to $b_0(11...1)$ during the interval [T,3T/2]. Of course delay unit 102 is again presenting elements $b_0(00...0)$ to $b_0(011...1)$ during this same interval. With $j_0$ now changed from 0 to 1 in the exponential function presented at the input of the multiplier 100, all is in order to generate elements $b_1(100...0)$ to $b_1(11...1)$ during the interval [T,3T/2].

As was the case with the previously discussed circuits, when the list being generated by the circuit of FIG. 3 is other than $b_1$, a delay shorter than T/2 and a corresponding increase in the frequency of switching of switches 104 and 106 is required. Specifically the delay at the $l^{th}$ stage will be $T/2^l$ and switches 104 and 106 will be switched once during each $T/2^l$ seconds. In all cases, however, the same functional blocks are used and the required correctly paired elements from the previous list are always available on two separate occasions.

The computational rate of the above-described circuits depends directly upon the time required to cycle the operands through delay units and arithmetic stages. Real-time operation is achieved by employing circuitry capable of performing at least one complex multiplication and one addition during a sampling interval $\Delta t$. For speech signals having frequency components in the range [0,4000Hz.], sampling intervals no smaller than 125 μsec. are entirely adequate. Because state-of-the-art circuitry is capable of operating at much higher speeds, real-time spectrum analysis of signals having a much wider spectrum than the above-mentioned speech signals is possible with the present invention. For example, if the required multiplication and addition can be performed in 2 μsec., the spectrum of signals having components as high 250kHz. can be completely analyzed.

The high speed capability inherent in the present invention allows for the simultaneous spectrum analysis of many signals by a single $m$-stage analyzer. This is accomplished, typically, time-compressing each set of N samples corresponding to a given signal and then time-multiplexing each set of samples. The output results are then demultiplexed. This technique requires a time compressor for each signal but offers the advantage that the spectrum analyzer itself requires no changes from the configurations described above. Of course, the individual samples could be interleaved rather than entire sets of N samples, but if there were K signals this would require delay units K times as long as in the circuits of FIGS. 1—3.

Figure 4:
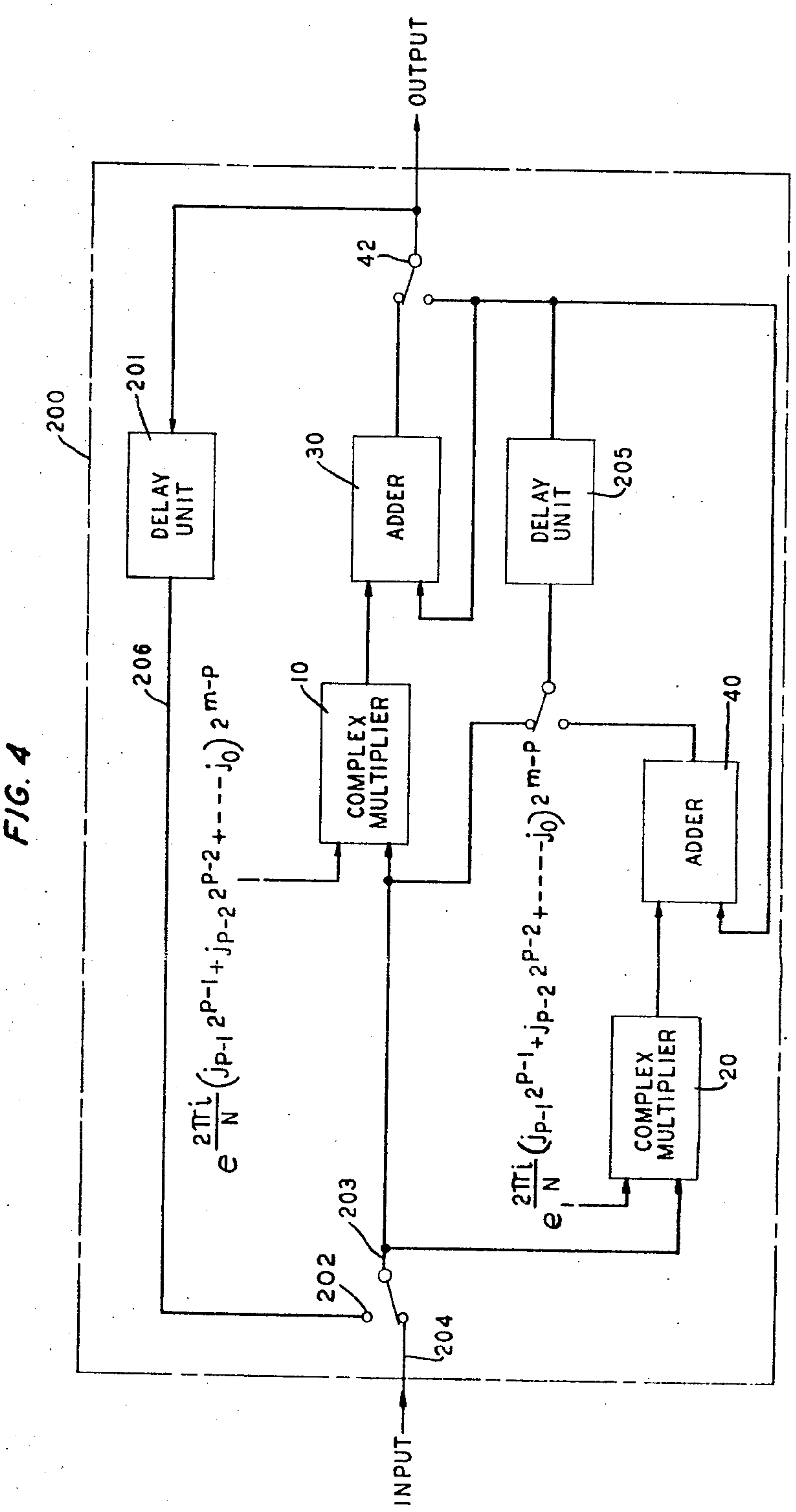
FIG. 4 shows a one-stage spectrum analyzer.

Although each of the embodiments described above require a number of stages differing from each other only in the duration of delay provided by their respective delay units, it is also possible under certain circumstances to perform a spectrum analysis using an embodiment of the present invention having but a single stage. One version of this single-stage spectrum analyzer is shown as 200 in FIG. 4. An additional variable-length delay unit 201 is used to reenter the elements of all but the last list $b_m$ at the input node 202. This allows the single stage to be used to construct each of the $m$ lists in sequence. Except for the addition of delay unit 201 and switch 203, and modification of the other delay unit 205, the elements of the circuit of FIG. 4 are precisely those shown in FIG. 2. The delay 205 in FIG. 4 is merely a variable-length version of the corresponding delay unit 70 in FIG. FIG. 2.

The circuit of FIG. 4 requires that switch 203 be in its lower position for T seconds beginning at the instant $t = 0$ when the first element of $b_0$ is presented at node 204. As in the circuit of FIG. 2, $b_1(00...0)$ appears at node 42 at $t$ = T/2; other elements of $b_1$ are sequentially generated at $\Delta t$ intervals. Delay unit 201 is adjusted for this first iteration to introduce a delay of duration T/2. Thus, at $t$ = T, the first half of list $b_1$ will have been entered into delay unit 201 and $b_1(00...0)$ will be about to appear at node 206. Since the list $b_0$ will be complete at $t$ = T, switch 203 is moved at that time without interrupting the input list. Thus, the list $b_1$ can be entered at node 202 immediately after $t$ = T. At $t$ = 3T/2, list $b_1$ being complete, the delay units 201 and 205 are adjusted to meet the requirements for calculating list $b_2$. As mentioned in the discussion relating to the circuits of FIGS. 1 and 2, the delay of delay unit 70 (205 in FIG. 4) must be halved. Thus, delay unit 205 is adjusted to provide a delay of T/4. To prevent any loss of data, though, the delay through delay unit 201 must be increased by the same amount as the delay through delay unit 205 is decreased. This pattern of concurrent increases and decreases is followed after each list is complete; in all cases, the total delay provided by delay units 201 and 205 together remains constant.

The single-stage embodiment of the present invention shown in FIG. 4 is particularly useful for signals of limited duration because the "period" of the signal, T, can then be taken as its entire duration. In the case of short duration signals like those presented by seismographic data or cardiograms, it does not matter that new data cannot be entered continuously, because each signal will be unrelated to the previous one.

Figure 5:
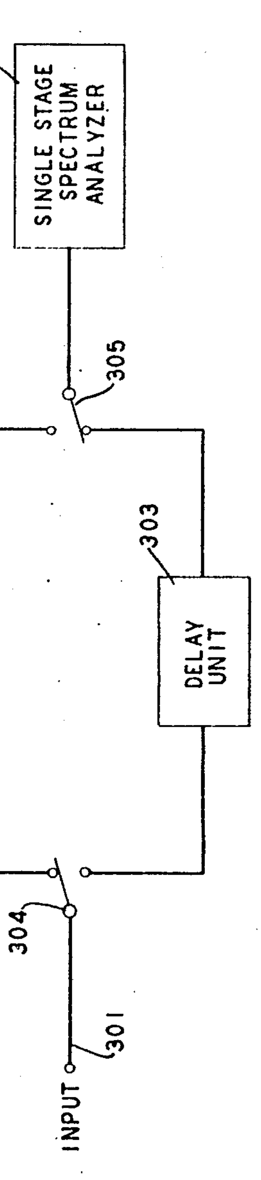
FIG. 5 shows an adaptation of the spectrum analyzer of FIG. 4 arranged to operate in real time.

FIG. 5 shows one arrangement for achieving real-time spectrum analysis using a single-stage analyzer 200 of the type shown in FIG. 4. Here the input list $b_0$ is presented continuously at a rate R at node 301 starting at $t$ = 0. Assuming the switches 304 and 305 are in the positions shown, a first input list is completely entered in delay unit 302 at time $t$ = T. At this time, the positions of switches 304 and 305 are reversed. The first input list is then read into the analyzer 200 at a rate $m$R while a second input list is being entered in delay unit 303 at rate R. The roles played by the delay units 302 and 303 are then reversed at $t=2T$ and every T seconds thereafter.

The buffering provided by delay units 302 and 303 allows the spectrum analyzer 200 to analyze continuous signals as it would limited-duration signals. Of course, this arrangement requires the circuitry of the analyzer to function at a rate $m$ times greater than it would for a signal having an input list $b_0$ presented at rate R, but for many commonly used signals this presents no insurmountable problem.

Figure 6:
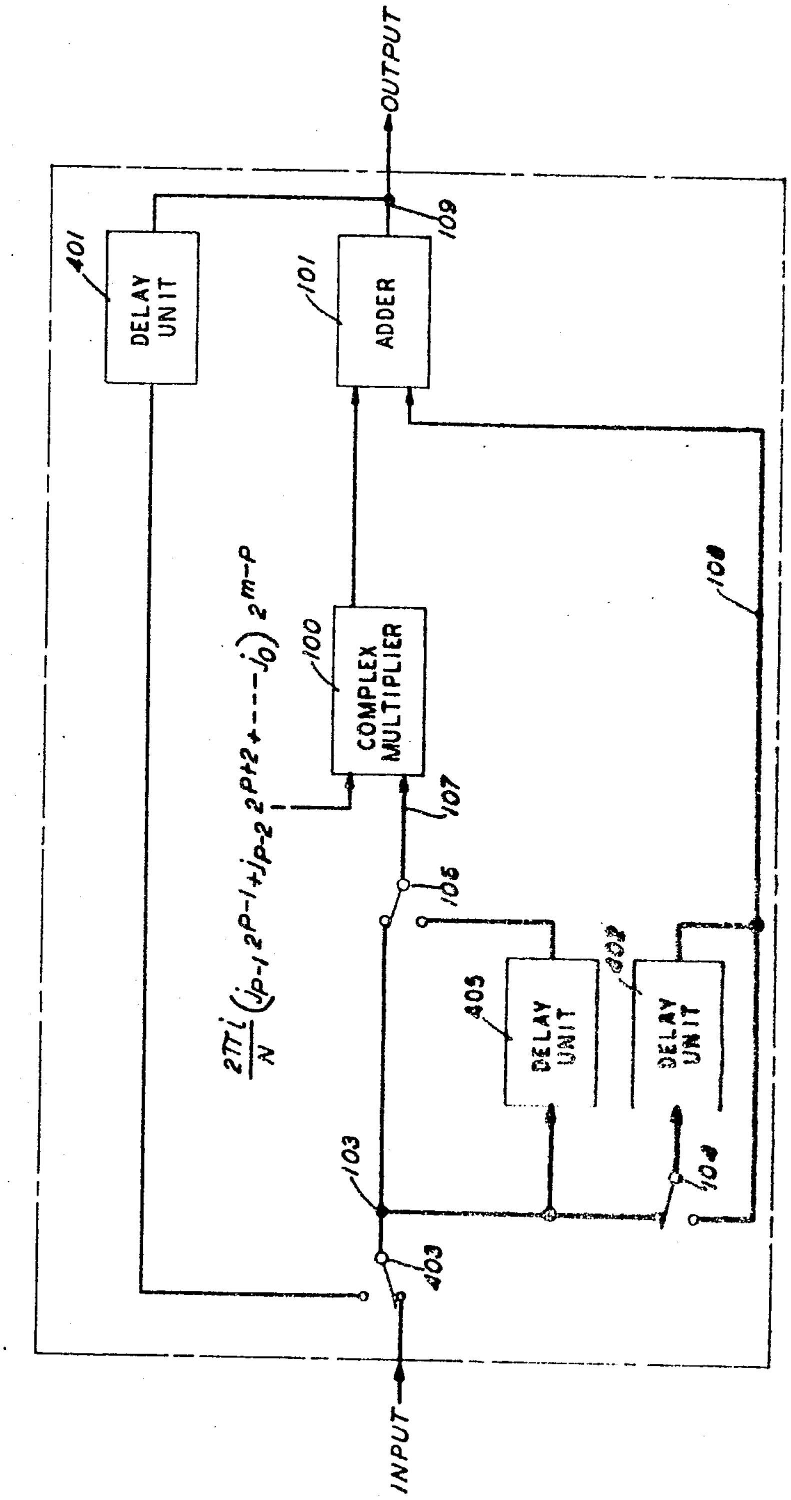
FIG. 6 shows an adaptation of the circuit of FIG. 3 for use as a single-stage analyzer.

FIG. 6 shows an adaptation of the circuit shown in FIG. 3 for use as a single-stage analyzer. Here delay unit 401 and switch 403 perform functions analogous to corresponding elements 201 and 203 in FIG. 4. As was the case in the circuit in FIG. 4, the delay units must provide variable duration delay. Here the delay units 402 and 405 (corresponding to 102 and 105 in FIG. 3) will each have their delay halved after each iteration. Delay unit 401, meanwhile, will have its delay increased by the amount of the corresponding decrease in delay duration of unit 402.

The final list of spectral coefficients $b_m$ generated by any one of the above embodiments of the present invention are presented in order of ascending $k$. That is, the first coefficient to appear at the analyzer output is $b_m(00...0)$. This is followed by $b_m(00...01)$ and so on up to $b_m(11...1)$. Because of the grouping technique that is basic to the Cooley-Tukey approach, however, it happens that there is no direct correspondence between the argument $k$ and the $k^{th}$ harmonic component. As an illustration, consider the case where $N=2^m=2^3$. The final list of coefficients generated by one of the above described embodiments contains elements $b_3(0)...b_3(7)$. A reordering of these elements is necessary to give the Fourier coefficients $s_k$, $k=0,1,2,...7$ in their proper sequence. For this case the transformation takes the form:

$$s_0=b_3(0) \qquad s_4=b_3(1)$$
$$s_1=b_3(4) \qquad s_5=b_3(5)$$
$$s_2=b_3(2) \qquad s_6=b_3(3)$$
$$s_3=b_3(6) \qquad s_7=b_3(7)$$

Figure 7:
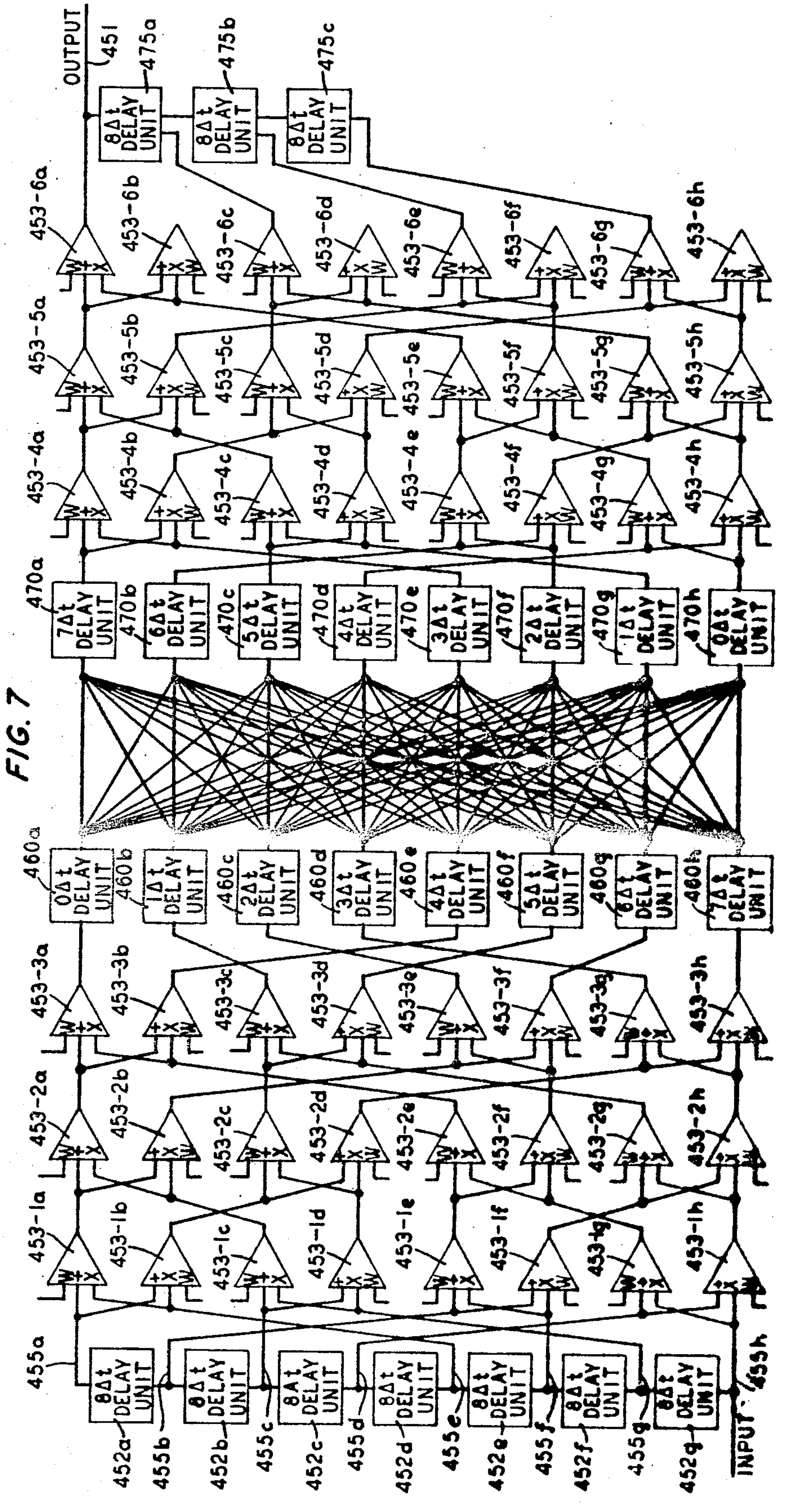
FIG. 7 shows an embodiment of the present invention which generates Fourier coefficients in order of ascending frequency.

FIG. 7 shows a circuit for generating the Fourier coefficients in their proper order for the case where $N=2^m=2^6=64$. The input list $b_0$ is applied at node 455*h* and the Fourier coefficients $s_k$ appear in order of ascending $k$ at output node 451. The delay units 452 *a—g* are identical and provide a delay of duration $8\Delta t$. The triangles 453 are combination complex-multiplier-adders which accept three inputs, multiplying two of them together and adding the product to the third. Each successive list $b_k$ is generated at the output of a column of triangles 453. In each case the multiplier is the appropriate complex exponential term represented as the uppermost input, $w$, to the triangle. The multiplicand is, as before, an appropriate element from the immediately preceding list. This input is marked with an $x$. The remaining input to the triangles marked with a +, is the term from the preceding list that must be added to the product. Delay units 460 *a—h*, 470 *a—h*, and 475 *a—c* provide delays as indicated in FIG. 7.

Figure 8A:
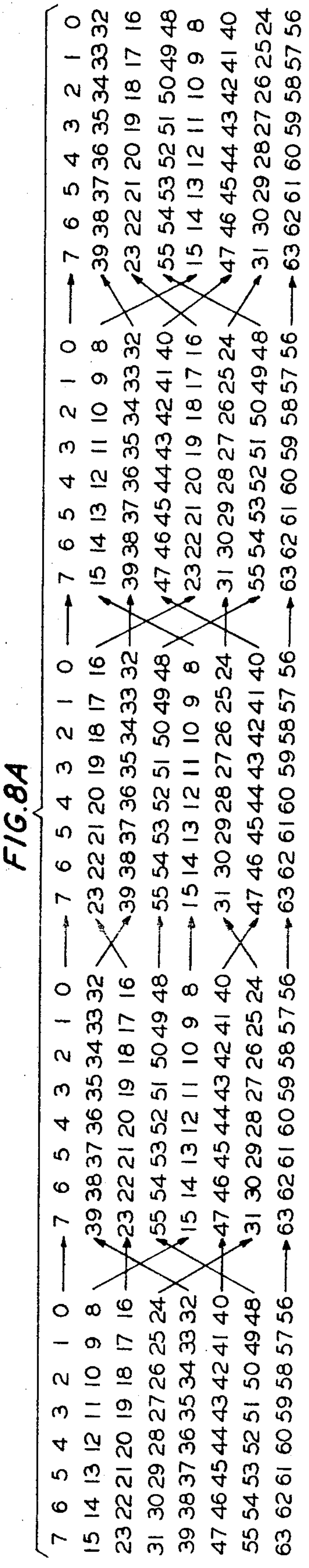
FIG. 8 consisting of FIGS. 8A and 8B, is a series of matrices which are useful in understanding the circuit of FIG. 7.

FIGS. 8*a* and *b* show the processing and rearranging accomplished by the circuit of FIG. 7. At the left of Fig. 8*a* is shown a matrix of 8 rows and 8 columns. Each row, reading from right to left, shows the argument $k$ of the list element $b_0(k)$ in their order of appearance at nodes 455 *a—h*. For example, the top row shows that $b_0(0)$, ...$b_0(7)$ will appear in sequence at 455*a*. Likewise the bottom row in that leftmost matrix of FIG. 8*a* shows that $b_0(56)$, ..., $b_0(63)$ will appear in sequence at node 455-*h*. Further, all elements having arguments in a given column will reach their respective nodes at the same time. The second matrix from the left displays the arguments of the elements of list $b_1$. Succeeding matrices show the placement of certain elements as the processing proceeds.

Figure 8B:
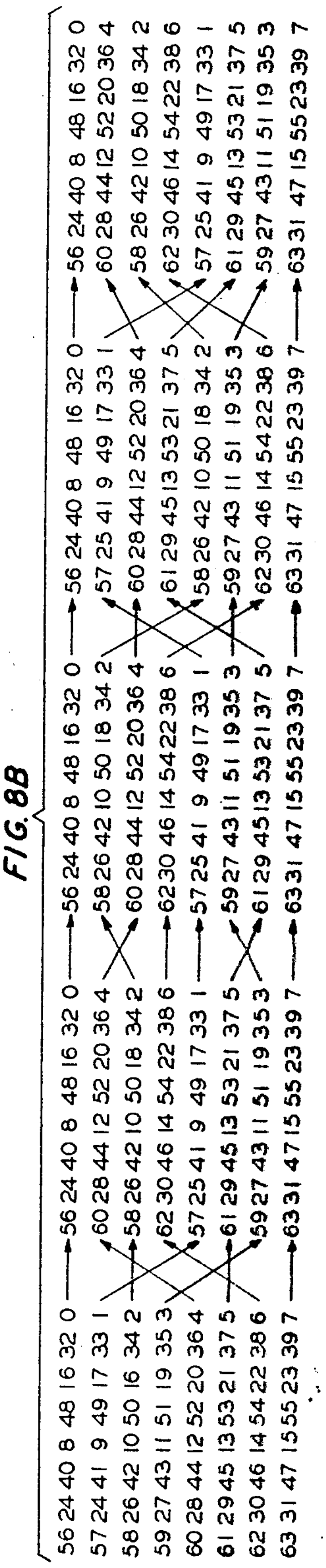

The steps performed in the processing of the list $b_0$ to produce the Fourier coefficients $s_k$ can be understood by tracing the matrix of coefficients of $b_0$, proceeding from left to right first in FIG. 8*a*, then in FIG. 8*b*. These steps are:

1. Rearranging the $b_0$ elements and computing the $b_1$ elements using multiplier-adders 453-1*a* to 453-1*h*;
2. Rearranging the $b_1$ elements and computing the $b_2$ elements using multiplier-adders 453-2*a* to 453-2*h*;
3. Rearranging the $b_2$ elements and computing the $b_3$ elements using the multiplier-adders 453-3*a* to 453*h*;
4. Rearranging the $b_3$ elements;
5. Performing a matrix transpose of the resulting arrangement using delay units 460 *a—h*, 470 a—h, and their interconnections;
6. Rearranging the transposed elements and computing the $b_4$ elements using multiplier-adders 453-4*a* to 453-4*h*;
7. Rearranging the $b_4$ elements and computing the $b_5$ elements using the multiplier-adders 453-5*a* to 453-5*h*;
8. Rearranging the $b_5$ elements and computing the $b_6$ elements using the multiplier-adders 453-6*a* to 453-6*h*; and
9. Selectively delaying the $b_6$ elements to produce the Fourier coefficients in the correct sequence.

As in the case of the earlier described embodiments of the present invention, a considerable amount of multiplexing of the intermediate lists is easily realized. This is accounted for by two factors: first, not all of the delay units are, or need be, used simultaneously; second, the multiplier-adders are possessed of great operational speed. Thus, a small number of elements of each functional type can by well-known time-sharing techniques, be employed to perform the required functions of the various circuit elements shown in FIG. 7. All that is required is high-speed computing and interconnecting circuitry, and an efficient bookkeeping system.

The above-described embodiments of the present invention are merely representative of those within the scope of the invention. An obvious modification of the techniques described above is that adapting them for analog use. That is, the memory and arithmetic elements above could easily be replaced by corresponding analog elements. The input signals then need not be quantized and coded into digital form as in a digital system. These and other modifications and extensions within the spirit of the present invention will occur to those skilled in the art.

We claim:

1. Apparatus for generating Fourier series coefficients corresponding to N ordered samples of a time-varying signal comprising:

A. a source of trigonometric function values;

B. at least one ordered computational stage each of which is able to accept N ordered input values and generate as an output a total of N ordered Fourier series coefficients, said coefficients forming at least one complete Fourier series corresponding to selected ones of said N input values and selected trigonometric values; and C. means for connecting the output of each of said stages, except the last, to the input of the next succeeding stage, the input to the first stage being said N samples, and the output of the final stage being said Fourier coefficients corresponding to said N samples.

2. Apparatus of claim 1 wherein each of said computational stages comprises:

A. a multiplier for forming the product of selected ones of said input values and selected ones of said trigonometric values; and B. means for completing the formation of said coefficients by effecting the sum of selected others of said input values to said product.

3. The apparatus of claim 1 wherein the $l^{th}$ of said computational stages comprises:

A. a first complex multiplier for sequentially forming $N/2^l$ products of $N/2^l$ selected trigonometric function values and respective ones of a first set of $N/2^l$ of said input values;

B. a second complex multiplier for sequentially forming $N/2^l$ products of $N/2^l$ other selected trigonometric function values and respective ones of said first set of $N/2^l$ of said values, C. a first adder for sequentially forming a first set of $N/2^I$ Fourier coefficient outputs by adding to each of said products from said first multiplier a corresponding term selected from a second set of $N/2^I$ input values, said first and second sets of input values being mutually exclusive; and D. a second adder for sequentially forming a second set of $N/2^I$ Fourier coefficient outputs by adding to each of said products from said second multiplier a corresponding term selected from said second set of $N/2^I$ input values.

4. The apparatus of claim 3 further comprising:

A. a first memory unit for storing elements of said second set of $N/2^I$ input values;

B. means for accessing each of said second set of $N/2^I$ input values in turn and concurrent with the presentation of said corresponding one of said products from said first multiplier to said first adder; and C. means for presenting each of said accessed values to said first adder.

5. The apparatus of claim 4 further comprising:

A. a second memory unit for storing accessed second set of $N/2^I$ ordered Fourier coefficients from said second adder; and B. means for accessing said second set of $N/2^I$ coefficients.

6. The apparatus of claim 5 wherein said first and second memory units comprise first and second serial memory units respectively.

7. The apparatus of claim 4 further comprising:

A. means for presenting each of said accessed values to said second adder; and

B. means for concurrently presenting said corresponding one of said products from said second multiplier to said second adder.

8. The apparatus of claim 5 further comprising means for alternately reading respective sets of $N/2^I$ Fourier coefficients from said first adder and said second memory unit.

9. The apparatus of claim 1 wherein each computational stage comprises a plurality of arithmetic units, the inputs of each of said arithmetic units being connected to the outputs of selected ones of said arithmetic units of the immediately preceding stage.

10. The apparatus of claim 9 further comprising a plurality of delay units interposed between each arithmetic unit of selected stages, and means for interconnecting said delay units in such manner as to effect a reordering of values presented at the input of said delay units, whereby the output of the last of said computational stages comprises the Fourier coefficients corresponding to said N samples, said last-named coefficients being ordered according to increasing corresponding frequencies.

11. Apparatus according to claim 1 wherein each of said computational stages comprises:

A. means for forming products of each of a first subset of said N input values with a corresponding one of said trigonometric function values;

B. means for forming the sum of each of said products and a corresponding one of a second subset of said N input values, said first and second products being mutually exclusive; and C. means for forming the difference between each of said subset and a corresponding one of said second subset of said N input values.

12. Apparatus according to claim 11 further comprising first means for storing selected ones of said sums and said differences prior to making them available to the following computational stage.

13. Apparatus according to claim 11 further comprising first means for storing all of said differences based on said first and second subsets.

14. Apparatus according to claim 13 wherein the $I^{th}$ of said computational stages each of said first and second subsets comprises $N/2^I$ input values and wherein said first means for storing comprises means for storing $N/2^I$ of said difference signals.

15. Apparatus according to claim 14 further comprising second means for storing said first subset of input signals.

16. Apparatus according to claim 14 wherein said first means for storing further comprises means for storing said first subset of said input values.

17. Apparatus according to claim 11 wherein at the $I^{th}$ of said computational stages each of said first and second subsets of input values comprises $N/2^I$ input values and wherein at said $I^{th}$ computational stage there is generated a set of $N/2^I$ sums and $N/2^I$ differences, further comprising first machine means for storing $N/2^I$ data quantities.

18. Apparatus according to claim 11 wherein said first machine memory means comprises serial memory means having a memory input, a memory output, $N/2^I$ data locations interposed between said input and output, and means for sequentially propagating data presented at said input through said $N/2^I$ data locations to said output.

19. Apparatus according to claim 18 further comprising means for applying in sequence at said memory input said first subset of input values:

20. Apparatus according to claim 19 further comprising means for applying in sequence at said memory input each of said difference signals as it is formed.

21. Apparatus according to claim 1 further comprising a buffer having a plurality of storage locations for storing a plurality of distinct input sequences, each input sequence comprising N ordered samples, and means for applying in turn each of said input sequences to the first of said stages.

22. Apparatus according to claim 21 wherein each of said distinct input sequences comprises N ordered samples of a time-varying signal which is distinct from each of the time-varying signals samples of which are included in the other distinct input sequences, further comprising means for distributing samples from each of said distinct time-varying signals to respective ones of said storage locations in said buffer.

23. Apparatus according to claim 1 further comprising means for reordering said coefficients such that they are arranged in monotonic frequency order.

24. Apparatus according to claim 1 wherein each of said computational stages comprises:

A. means for forming products of selected ones of said input values with corresponding selected ones of said trigonometric values;

B. means for forming the sum of each of said products and a corresponding other one of said input values; and C. means for forming the difference between each of said products and said corresponding other ones of said input values.

25. Apparatus for generating Fourier series coefficients corresponding to an ordered sequence of N sample values of a time-varying signal comprising:

A. means for generating ordered sequences of N trigonometric function values;

B. at least one ordered computational stage, each of said stages comprising:

a. first and second input terminals and an output terminal;

b. means for forming successive products of successive values presented at said first input terminal and corresponding values presented at said second input terminal;

c. means for forming successive sums of each of said products and a selected other value presented at said second input; and d. means for applying said sums to said output terminal; and C. means for applying one of said ordered sequences of N trigonometric values to said first input terminal of each of said computational stages;

D. means for applying said ordered sequence of N sample values to said second input of the first of said computational stages; and E. means for connecting the output terminal of each of said computational stages to said second input terminal of the next succeeding computational stages, the output terminal of the last of said stage presenting in sequence the desired Fourier series coefficients based on said sequence of N sample values.

26. The apparatus of claim 25 comprising *m* computational stages, where $N = 2^m$, and wherein said ordered sample values, said trigonometric function values and said Fourier coefficients are represented by binary digits.

27. Apparatus for generating Fourier series coefficients corresponding to N sample values of a time-varying signal comprising:

A. a circuit having an input node and an output node for accepting sets of input values at said input node and for generating sets of Fourier series coefficients each corresponding to selected ones of said input values, said coefficients appearing at said output node;

B. means for applying a first set of N input values comprising said N sample values to said input node;

C. means for connecting said output node to said input node thereby recirculating said coefficients corresponding to selected ones of said input values, said recirculated coefficients thereby forming a sequence of sets of N input values; and D. means for disconnecting said output node from said input node when each of the coefficients appearing at said output node corresponds to all of said N sample values.

28. Apparatus according to claim 27 wherein said means for connecting comprises means for delaying the set of coefficients corresponding to selected ones of said N sample values until all of said N sample values have been applied to said input node.

29. Apparatus according to claim 27 wherein said means for applying comprises means for applying each of said N sample values in equispaced time sequence over an interval of duration T.

30. Apparatus according to claim 29 wherein $N = 2^m$, where *m* is a positive integer, and wherein said means for connecting comprises means for recirculating a sequence of $(m-1)$ sets of N coefficients, thereby applying a sequence of $(m-1)$ sets of N input values in addition to said first set of N input values.

31. Apparatus according to claim 30 wherein said means for connecting further comprises first delay means for delaying the $I^{th}$ set of said recirculated coefficients by an amount D given by $$D=\sum_{l=1}^{I}\frac{T}{2l}$$

32. Apparatus according to claim 31 wherein said circuit comprises:

A. second delay means for delaying alternate subsets of said sets of N input values applied at said input node, each alternate subset of said $I^{th}$ set of recirculated coefficients comprising $N/2^I+1$ input values, each alternate subset of said set of N sample values comprising N/2 values, said delay in each case having a duration equal in magnitude to the time required to sequentially apply the next subset to said input node;

B. a first multiplier for forming first product signals corresponding to the product of input values not in one of said alternate subsets delayed by said second delay means and a first corresponding set of trigonometric function values;

C. a second multiplier for forming second product signals corresponding to the product of input values not in one of said alternate subsets delayed by said second delay means and a second corresponding set of trigonometric function values;

D. a first adder for forming first sum signals corresponding to the sum of each of said first product signals and a corresponding one of said delayed input signals;

E. a second adder for forming second sum signals corresponding to the sum of each of said second product signals and a corresponding one of said delayed input signals; and F. means for alternately applying ordered sequences of said first and second sum signals, respectively, at said output node.

33. The iterative machine method for generating Fourier series coefficients corresponding to an ordered sequence of $N = 2^M$ input samples of an input signal comprising the steps of:

A. storing an input sequence comprising the first N/2 of said input samples in a machine memory;

B. machine forming a first ordered sequence of N/2 product signals corresponding to the product of consecutive ones of the second N/2 of said input sequence of input samples with respective ones of a first corresponding sequence of N/2 trigonometric function values;

C. machine forming a second ordered sequence of N/2 product signals corresponding to the product of consecutive ones of the second N/2 of said input sequence of input samples with respective ones of a second corresponding sequence of N/2 trigonometric function values;

D. machine adding consecutive ones of said first N/2 of said input samples to consecutive ones of said first sequence of N/2 product signals, thereby to form a first sequence of N/2 sum signals;

E. machine adding consecutive ones of said first N/2 of said input samples to consecutive ones of said second sequence of N/2 product signals, thereby to form a second sequence of N/2 sum signals;

F. machine forming an output sequence of N sum signals by combining said first and second sequences of N/2 sum signals, said first sequence of N/2 sum signals preceding said second sequence of N/2 in said sequence of N sum signals; and G. iteratively repeating for I = 2,3,...,M steps A through F with N replaced at each occurrence at the $I^{th}$ iteration by $N/2^{I-1}$, the input sequence replacing said sequence of input samples at the $I^{th}$ iteration being the output sequence from the $(I-1)^{th}$ iteration.

34. The machine method of claim 33 wherein step B comprises, at the $I^{th}$ iteration, machine forming a first sequence of $N/2^I$ product signals corresponding to the product of:

A. consecutive ones of said input sequence beginning with the $(N/\mathbf{consecutive}^I + 1)^{th}$ signal of said input sequence;

B. respective ones of said trigonometric function values, said trigonometric function values being given by $$e^{(2\pi i/N)(j_{I-1}2^{I-1}+j_{I-2}2^{I-2}+\ldots+j_0)2^{M-I}},$$

$j_{I-1}, j_{I-2}, \ldots, j_0$ being binary digits in monotonic decreasing significance which indicate the position in said input sequence of said corresponding consecutive one of said input signals.

35. Apparatus for generating output signals representing Fourier series coefficients corresponding to a plurality of input signals comprising:

A. a plurality of ordered computational units, each of said units comprising an input, an output, and means for generating at said output a plurality of signals representing Fourier series coefficients in response to a plurality of signals applied at said input, each of said Fourier series coefficients corresponding to selected ones of said signals applied at said input; and B. means for connecting the output of each of said units, except the last, to the input of another of said units, said plurality of input signals being applied to the input of a first of said units, and the output of the final stage being said output signals.

36. Apparatus according to claim 35 wherein each of said computational units comprises:

A. means for forming product signals representing the product of selected ones of said plurality of signals applied at said input and signals representing corresponding trigonometric function values; and B. means for forming sum signals representing the sum of each of said product signals and a corresponding other one of said signals applied at said input.

37. Apparatus according to claim 36 wherein said plurality of input signals comprises a sequence of $N = 2^m$ input signals, N and $m$ being positive integers, and wherein said means for forming product signals comprises at the $p^{th}$ computational unit means for forming the product of a $k^{th}$ input signal and a corresponding trigonometric function signal given by $$e^{(2\pi i/N)(j_{p-1}2^{p-1}+j_{p-2}2^{p-2}+\ldots+j_0)2^{m-p}}$$

where $j_{p-1}, j_{p-2}, \ldots, j_0$ are binary digits related to $k$ by the relationship $$k=j_0 2^{m-1}+j_1 2^{m-2}+\ldots+j_{p-1}2^{m-p-2}+k_{m-p-1}2^{m-p-3}+\ldots+k_0$$

where $k_{m-p-1}, \ldots, k_0$ are other binary digits

38. The machine method of computing a set of Fourier series coefficients corresponding to a set of input signals comprising the steps of:

A. storing a first subset of said set of input signals in a machine memory;

B. forming in a machine product signals representing the product of each of a second subset of said set of input signals with a signal representing a corresponding trigonometric function value;

C. forming in a machine a set of sum signals each of which sum signals represents the sum of one of said product signals and a corresponding one of said first subset of said set of input signals, thereby to form a set of Fourier series coefficient each corresponding to at least some of said input signals; and D. iterating steps A through C with the set of input signals being replaced at each subsequent iteration by subsets of said set of sum signals formed at the preceding iteration, said iterating proceeding until said sum signals each represents one of the Fourier series coefficients corresponding to all of said set of input signals.

39. The method of claim 38 wherein at a given iteration the input signals are provided by machine selecting two distinct sets of signals each comprising one-half of said set of sum signals from the previous iteration corresponding to a given set of input signals.

40. The machine method of computing sets of Fourier coefficients corresponding to sets of input signals comprising the steps of:

A. storing a first subset of each of said sets of input signals in a machine memory;

B. forming in a machine product signals representing the product of each of a second subset of each of said sets of input signals with a signal representing a corresponding trigonometric function value;

C. forming in a machine sets of sum signals each of which sum signals represents the sum of one of said product signals and a corresponding signal in the first subset of one of said sets of input signals, said corresponding signal in the first subset being in the same set of said input signals as the input signal used in forming the product signal with which said corresponding signal of the first subset is summed, thereby to form a Fourier coefficient corresponding to at least some of said input signals; and D. iterating steps A through C with each set of input signals being replaced at each subsequent iteration by subsets of said sets of sum signals formed at the preceding iteration, said iterating proceeding until said sum signals each represent one of the Fourier series coefficients corresponding to all of the input signals in one of said sets of input signals.

41. The machine method of computing a set of Fourier series coefficients corresponding to a set of $N = 2^m$ input values comprising iteratively performing, for $I = 1,2,3,\ldots,m$, the steps of:

A. storing in a machine memory $2^{I-1}$ sets of first input signals, each set of first input signals comprising $N/2^I$ input signals, said set of first input signals for $I = 1$ comprising a first set of N/2 of said input values;

B. forming in a machine $2^{I-1}$ sets of $N/2^{I-1}$ product signals, each of said product signals corresponding to the product of one of a set of $N/2^I$ second input signals with each of two signals representing distinct phasor quantities associated with one of said set of $N/2^I$ second input signals, each said set of second input signals being mutually exclusive of each other and of each of said sets of first input signals;

C. forming in a machine $2^{I-1}$ sets of $N/2^{I-1}$ sum signals, each of said sum signals corresponding to the sum of one of said first input signals and each of two corresponding product signals formed in step B, said sum signals formed at said $m$th iteration being said Fourier series coefficients corresponding to said N input values; and D. machine identifying two subsets of each of said sets of $N/2^{I-1}$ sum signals as sets of first and second input signals for the next iteration.

42. The method according to claim 41 further comprising the step of reordering the set of sum signals formed at the $m$th iteration in such manner that they are in ordered correspondence to the harmonic frequencies of said Fourier series.

43. Apparatus for for computing a set of Fourier series coefficients corresponding to a set of $N = 2^m$ input values comprising at the $I^{th}$ iteration, $I = 1,2,\ldots,m$:

A. memory means for storing $N/2^I$ first input signals in a machine memory;

B. product means for forming in a machine $N/2^{I-1}$ product signals, each of said product signals corresponding to the product of one of a set of $N/2^I$ second input signals with each of two signals representing distinct phasor quantities associated with said one of said set of second input signals, said set of second input signals being mutually exclusive of said set of first input signals;

C. summing means for forming in a machine $N/2^{I-1}$ sum signals, each of said sum signals corresponding to the sum of one of said first input signals and two corresponding distinct ones of said product signals;

D. machine means for identifying a first subset of said $N/2^{I-1}$ sum signals as first input signals for the next iteration, and for identifying a second subset of said $N/2^{I-1}$ sum signals as first input signals for the next iteration, and for identifying a second subset of said $N/2^{I-1}$ sum signals as second input signals for the next iteration, said set of first input signals for the $I = 1$ iteration being the first N/2 of said N input values, said set of second input signals for the $I = 1$ iteration being the second N/2 of said N input values, said sum signals at the $m$th iteration being said set of Fourier series coefficients;

E. means for applying said first input signals to said memory means;

F. means for applying said second input signals and said signals representing phasor quantities to said product means; and G. means for applying said first input signals and said product signals to said summing means.

44. Apparatus according to claim 43 further comprising means for storing said second subset of said sum signals until they are needed at the following iteration.